United States Patent [19]

McAllen

[11] Patent Number: 4,781,451
[45] Date of Patent: Nov. 1, 1988

[54] EYE PROTECTORS SUCH AS SPECTACLES, VISORS AND THE LIKE

[76] Inventor: Terry McAllen, 253 Manor Farm Road, Bitterne Park, Southampton, England

[21] Appl. No.: 913,011

[22] Filed: Sep. 26, 1986

[30] Foreign Application Priority Data

Oct. 7, 1985 [ZA] South Africa ............... 85/7704

[51] Int. Cl.$^4$ .................................................. G02C 3/00
[52] U.S. Cl. ...................................... 351/156; 351/155
[58] Field of Search ............... 351/156, 155, 157, 116, 351/118

[56] References Cited

U.S. PATENT DOCUMENTS 2,504,524  4/1950  Hayward ..................... 351/156
4,549,793  10/1985  Yoon .............................. 351/156

Primary Examiner—Rodney B. Bovernick
Assistant Examiner—P. M. Dzierzynski
Attorney, Agent, or Firm—Young & Thompson

[57] ABSTRACT

The invention provides for a pair of spectacles, a visor, a peak or the like item of eye protection or enhancement to be releasably attached to a head band, hat, cap or other form of headgear, the item being provided with three members including VELCRO or the like to match with the other half of the attachment means, if required, for the releasable attachment.

7 Claims, 4 Drawing Sheets

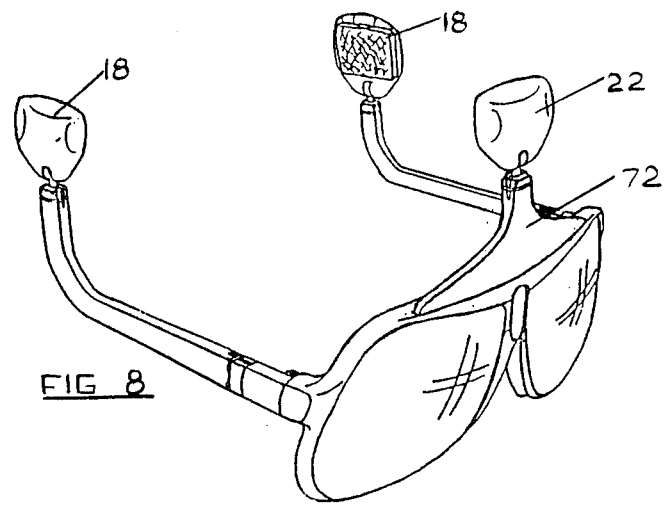
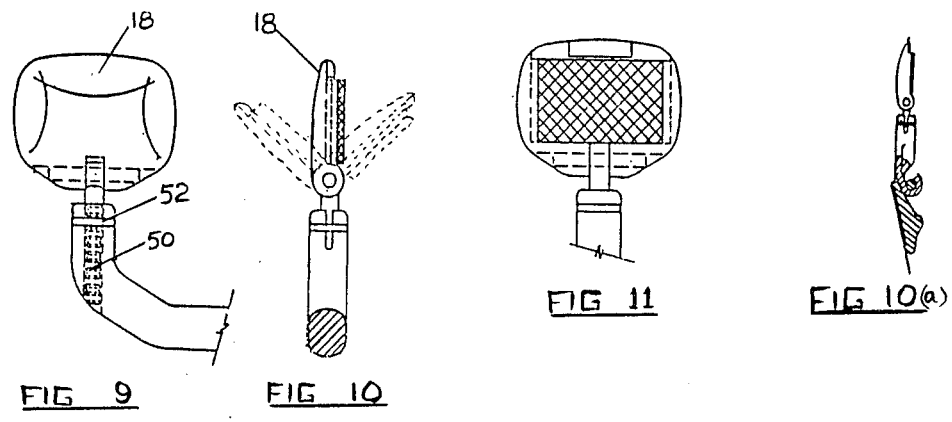
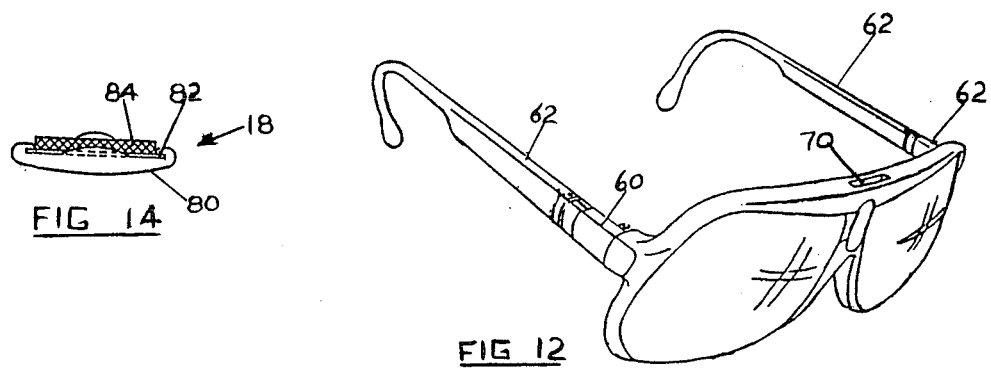
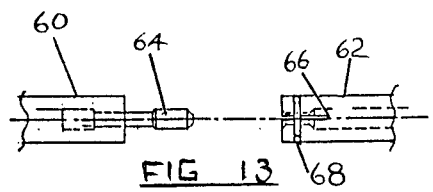

EYE PROTECTORS SUCH AS SPECTACLES, VISORS AND THE LIKE

FIELD OF THE INVENTION

This invention relates to spectacles, visors and the like.

BACKGROUND OF THE INVENTION

The conventional spectacles and visors include side elements which hang around the ears for support.

It is an object of the present invention to provide spectacles, visors and the like which may be attached to a head band or other headgear in order to prevent fogging of the visor or spectacles, to provide pleasing effects, to provide a protection for the eyes while playing sports or indulging in other activities, and to remove pressure from the bridge of the nose and the ears, while maintaining the translucent material (including optical lenses) at the correct distance from the eyes.

A search instituted at the European Patent Office revealed the existence of four patents.

U.S. Pat. No. 4,047,809 (Zuccatti) teaches the possibility of the side elements being adjustable in length of the wearer. Guide means are provided which permit sliding movement and locking members are provided. In French Pat. No. 2,452,121 elastic means are provided in association with side elements.

U.S. Pat. No. 3,582,194 relates to substantially the same arrangement as the French patent, the elastic portion being adjustable, while U.S. Pat. No. 4,153,348 has its side members telescopic and means are provided to maintain the effective length at the desired degree.

THE INVENTION

According to the invention an eye protector such as spectacles, a visor, or other eye protection, including improvement or enhancing items, is provided for combination with an article of headgear, the spectacles or the like being adapted to be removably attached to the headgear.

In this specification the term "headgear" is intended to include headbands, hats, caps, turbans and any other form of headgear.

In one form of the invention the side elements of the spectacles or the like are disconnectible from the frame and substitutable with other elements adapted to be removably attached to an article of headgear suspensively.

The means of attachment of the visor or spectacles to the headband is preferably the product known under the Trade Mark VELCRO but it will be appreciated that many other fixing arrangements may be used. In this way the visor or spectacles may be easily removed from the headband for the individual items to be cleaned.

The visor or spectacles may be plane perspex or the like material, this being the preferred form for use in sporting activities—for example, skiing, tennis, bicycling and the like. The material may be tinted for protection against glare.

It will be appreciated that this form of the invention is also adaptable to cosmetic purposes and it will be possible to own a series of different headbands and visors or spectacles for wearing at discos and other places of entertainment.

In another form of the invention the visor is adapted to receive one or more lenses—for example reading lenses or the wearer's prescription lenses. For example, the visor may be moulded with pockets for receiving the lenses; or light filters or the like.

For stability it is preferred to have at least three points of attachment of the visor to the headband but it will be appreciated that a continuous attachment is also possible.

Both headband and visor may have space for advertisement and it will be appreciated that a wide variety of shapes, sizes and designs are possible within the scope of the invention.

In yet another form of the invention side elements may include a slot groove or the like for receiving a pin or a formation in sliding relationship, with means such as stops, spring means, screws or the like, for temporary jointing. The elements for attaching to the head band may also include a similar jointing arrangement. Of course, it will be appreciated that the jointing formations may be reversed.

According to an important aspect of the invention a kit is provided which comprises a pair of spectacles, a visor or the like in combination with a pair of conventional side elements and a pair of elements adapted to be attached to a head band or the like. A head band or a number of headbands may also be provided in the kit.

The elements for attaching to the headgear may include formations which can receive a clip or the like having VELCRO on one side, the clip being reversible for attachment either to a headband or the like or to the inside of a hat or other headgear, the inside thereof being provided, if necessary with a complemental strip of VELCRO. This form of invention is particularly suited to bowlers' hats. The clips may be spring clips and may carry a Logo on one side and VELCRO on the other.

BRIEF DESCRIPTION OF THE DRAWINGS

FIGS. 2–8 are perspective and exploded perspective views of spectacles according to the present invention;

FIG. 9 is an outer side view on a larger scale, of a side securement member of the spectacles of the present invention;

FIG. 10 is a side elevational view of FIG. 9;

FIG. 10(a) shows an alternative form of hinge construction;

FIG. 11 is a view similar to FIG. 9 but showing the opposite side thereof;

FIG. 12 is a view similar to FIG. 1 but showing another conventional spectacles;

FIG. 13 is an enlarged fragmentary exploded view of connection structure for use in FIG. 12; and FIG. 14 is a top plan view of a side member as in FIG. 9.

EMBODIMENTS OF THE INVENTION

Embodiments of the invention are described below with reference to the accompaning drawings which are perspective views of various forms of the invention.

Figure 1:
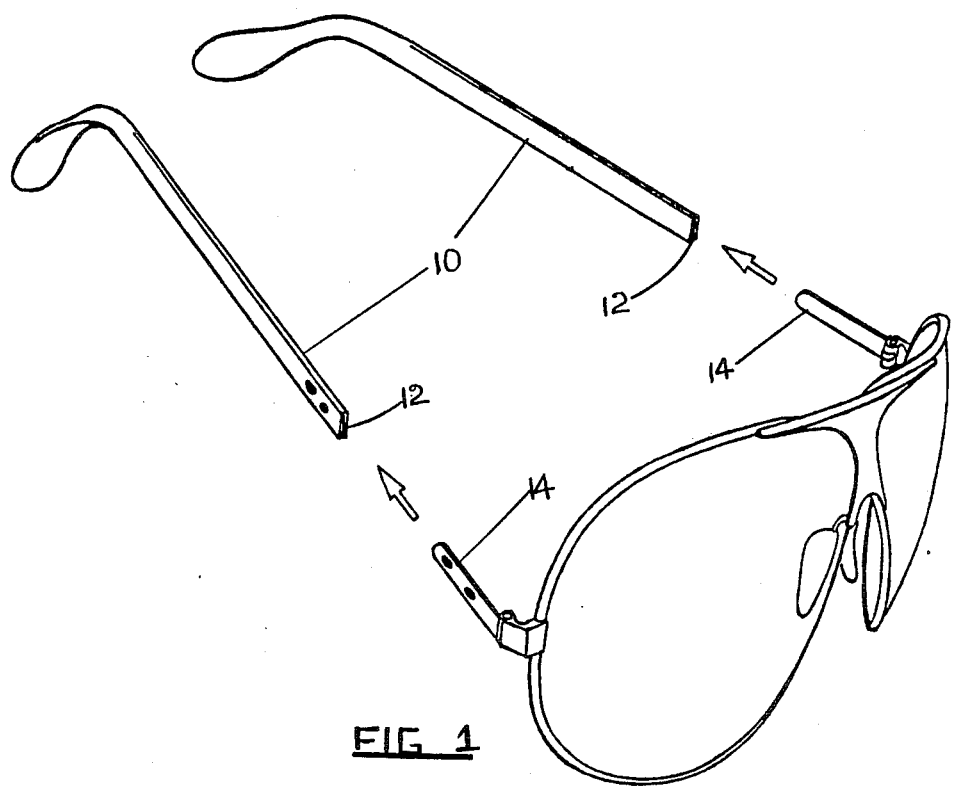
FIG. 1 is an exploded perspective view of a conventional pair of spectacles.

In FIG. 1 is shown a conventional pair of spectacles with a pair of rearwardly projecting side elements 10 including a slot 12 and a diminished portion which slides into the slot 12 and is held by screws or the like.

Figure 2:
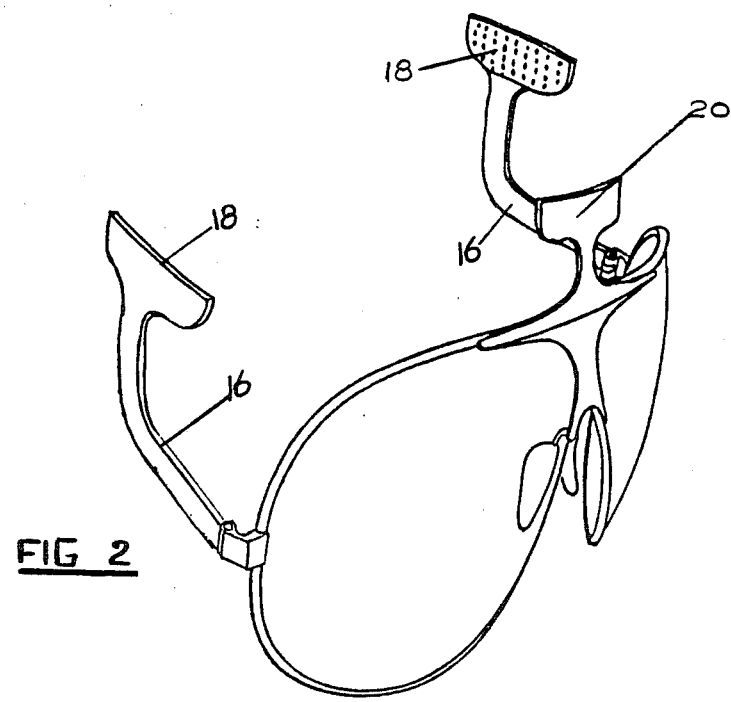

In FIG. 2, the side elements 10 have been replaced by elements 16 which extend upwardly to flat zones or members 18 covered with VELCRO (registered trade mark) or other covering for adhesion to a head band or the like. An additional formation or member 20 may be provided for an additional adhesion point.

Figure 3:
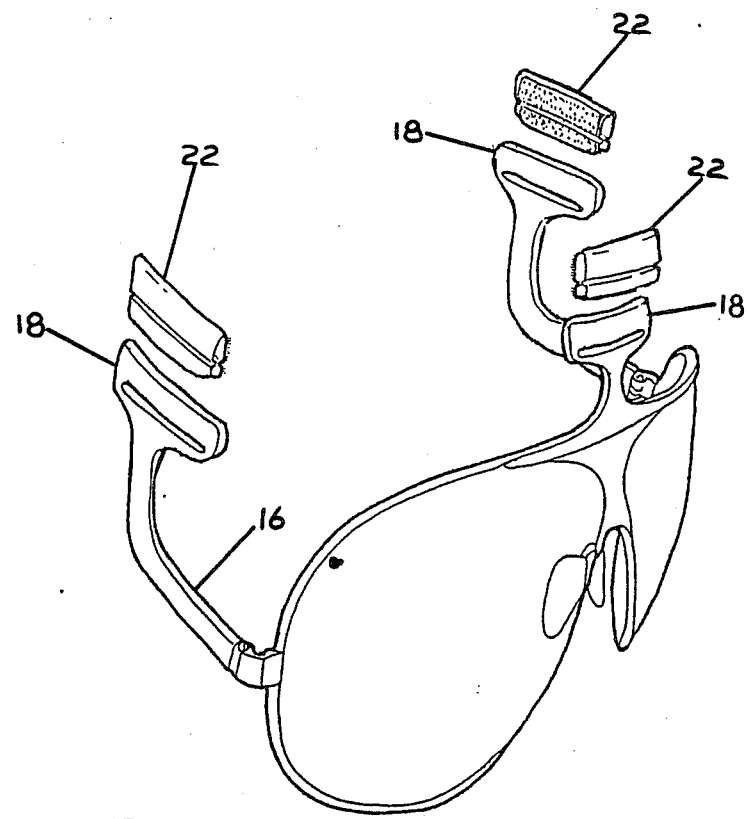

In FIG. 3 is shown another form of the embodiment shown in FIG. 2 but includes removable and reversible attachments 22 to the flat zones 18. These attachments 22 have one side covered in VELCRO which allows the spectacles to be attached to the inside of a hat or other headgear. The attachments may be made to either slide or clip on to the flat zones 18.

Figure 4:
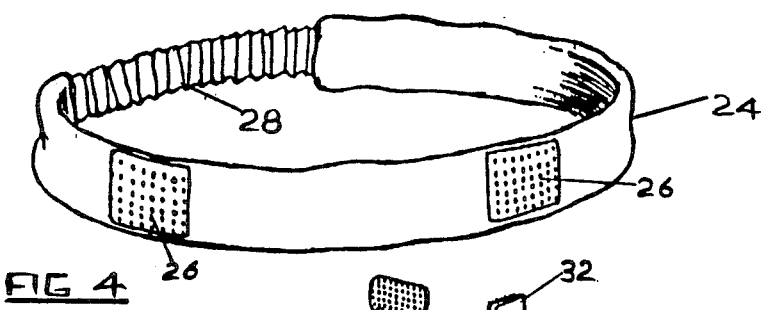

Reference to FIG. 4 illustrates a typical headband 24 with VELCRO adhesion members 26 and an elastic inner member 28.

Figure 5:
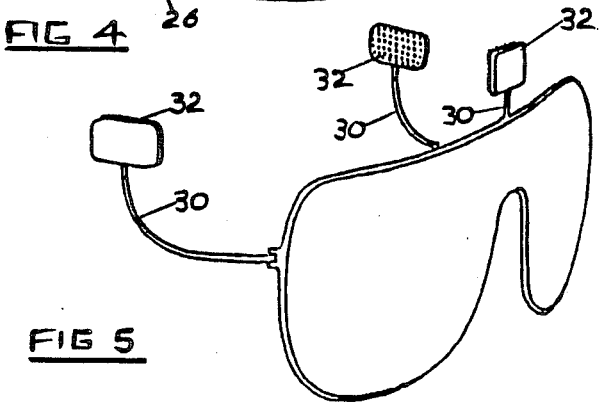

Referring to FIG. 5 the spectacles have attachment members 30 onto which VELCRO adhesion members 32 are mounted to correspond with those on FIG. 4.

Figure 6:
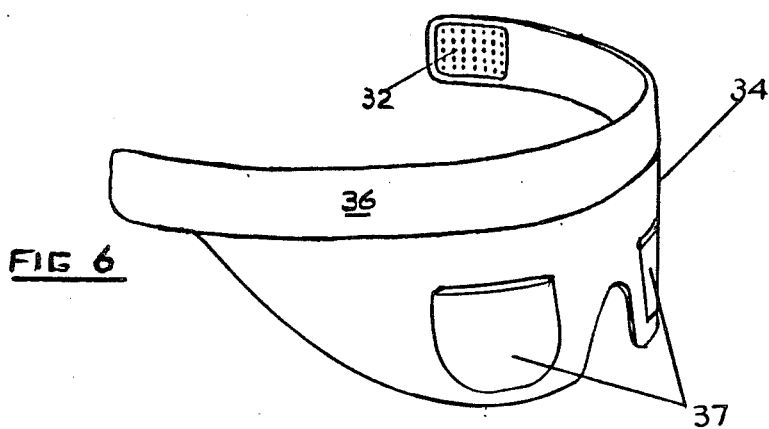

FIG. 6 illustrates a sun-visor 34 which also carries VELCRO adhesion members 32 attached to a band 36. It has pockets 37 which can receive eye correction lenses, light filters or the like.

Figure 7:
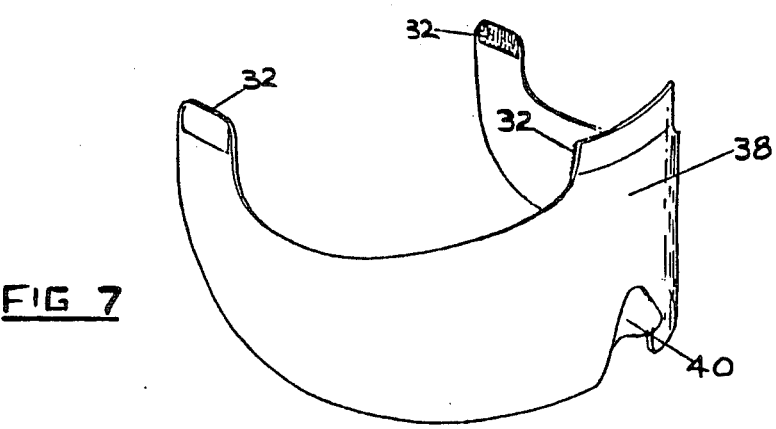

FIG. 7 depicts a face visor 38 also provided with VELCRO adhesion members 32 and having a cut-away formation 40 to allow the visor to sit over the nose.

It will be appreciated that a single headband may be worn and a variety of attachment members can be carried to meet any circumstance, and may be changed by the wearer with the minimum effort.

Elements 16,18 and 22 may be adjustable to cater for different-shaped heads; for example in FIG. 8 the elements 18 and 22 are hinged for tilting to match the shape of the head. These elements may further be adjustable in height and in this regard FIGS. 9 to 11 show a a possible arrangement whereby a multi-rebated shaft 50 is provided which can be set at a predetermined height maintained under tension by means of spring clip 52.

In FIGS. 10 and 10A are shown two hinge arrangements as well as various positions of the element 18 and it will be appreciated that the shaft 50 allows it to be swivelled any desired angle.

FIG. 12 shows a conventional pair of spectacles with an alternative arrangement to that shown in FIG. 1. In FIG. 13 the portions 60,62 are connected through a pin 64 and socket 66 with tension means such as a spring clip 68 or the like. Reverting to FIG. 12, a slot 70 (or a pair of slots, if required) is provided to receive a mounting 72 (as shown in FIG. 8).

Finally FIG. 14 is a plan view of an element 18 (or 22) comprising a polymer material portion 80 into which is fitted a metallic plate 82 for receiving the VELCRO strip 84.

It will be appreciated that conventional spectacles or the like may be provided with attachment members or elements in order to convert them to articles attachable to a headband or the like.

I claim:

1. An eye protector for combination with an article of headgear, the eye protector comprising:
    an eye protector for protecting at least one eye, the eye protector having a front side and, for juxtaposition with the eye, an opposite, rear side;
    a pair of side elements connected on one end respectively to opposite ends of the eye protector for projecting rearwardly of the eye protector;
    suspension means suspending the eye protector and side elements from an article of headgear, the suspension means comprising three members, two of the members respectively projecting upwardly from one, upward side of the side elements, and the third of the members projecting upwardly from a corresponding, upward side of the eye protector; and
    the suspension means further comprising connecting means for movably connecting the members respectively to the side elements and eye protector for horizontal pivotal movement of the members about vertical axes, whereby to adapt the members for suspension from variable headgear without relying on direct contact between the eye protector and the head of the wearer for support of the eye protector.

2. The eye protector as claimed in claim 1, wherein each of the members further comprises a fastener which is at least VELCRO-like.

3. The eye protector as claimed in claim 2, wherein the suspension means further comprises connecting means for movably connecting the members respectively to the side elements and eye protector, whereby to adapt the members for suspension from variable headgear.

4. The eye protector as claimed in claim 2, wherein the eye protector further comprises a pocket and a transparent member in the pocket, whereby the transparent member may be a lens.

5. The eye protector as claimed in claim 4, wherein the suspension means further comprises connecting means for movably connecting the members respectively to the side elements and eye protector, whereby to adapt the members for suspension from variable headgear.

6. The eye protector as claimed in claim 1, wherein the eye protector further comprises a pocket and a transparent member in the pocket, whereby the transparent member may be a lens.

7. The eye protector as claimed in claim 6, wherein the suspension means further comprises connecting means for movably connecting the members respectively to the side elements and eye protector, whereby to adapt the members for suspension from variable headgear.

* * * * *